US009920691B2

(12) United States Patent
Tall, Jr. et al.

(10) Patent No.: US 9,920,691 B2
(45) Date of Patent: Mar. 20, 2018

(54) ANTI-ICING INTERNAL MANIFOLD

(71) Applicant: UNITED TECHNOLOGIES CORPORATION, Farmington, CT (US)

(72) Inventors: Michael Thomas Tall, Jr., West Palm Beach, FL (US); Brian C. Lund, Moodus, CT (US); Jianming Huang, Old Lyme, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 392 days.

(21) Appl. No.: 14/611,316

(22) Filed: Feb. 2, 2015

(65) Prior Publication Data

US 2015/0330305 A1 Nov. 19, 2015

Related U.S. Application Data

(60) Provisional application No. 61/992,681, filed on May 13, 2014.

(51) Int. Cl.
| F02C 7/04 | (2006.01) |
| F02C 7/047 | (2006.01) |
| F01D 17/16 | (2006.01) |
| F01D 25/02 | (2006.01) |
| F04D 29/56 | (2006.01) |

(52) U.S. Cl.
CPC ............ *F02C 7/047* (2013.01); *F01D 17/162* (2013.01); *F01D 25/02* (2013.01); *F04D 29/563* (2013.01); *F05D 2240/121* (2013.01); *F05D 2250/611* (2013.01)

(58) Field of Classification Search
CPC ............... F01D 25/02; F05D 2240/121; F05D 2250/611; F02C 7/047
USPC ....................................................... 60/39.093
See application file for complete search history.

(56) References Cited

U.S. PATENT DOCUMENTS

| 2,559,851 A * | 7/1951 | Dean ...................... B64D 15/02 244/134 B |
| 2,600,302 A * | 6/1952 | Kinsella .................. F02C 7/047 244/121 |
| 3,933,327 A * | 1/1976 | Cook ...................... B64D 15/04 244/134 B |
| 4,860,534 A | 8/1989 | Easley et al. |

(Continued)

FOREIGN PATENT DOCUMENTS

EP      1895141      3/2008

OTHER PUBLICATIONS

International Search Report, International Application No./Patent No. 15167422.3-1607, dated Oct. 12, 2015, European Patent Office; International Search Report 7 pages.

*Primary Examiner* — Matthew W Jellett
(74) *Attorney, Agent, or Firm* — Cantor Colburn LLP

(57) ABSTRACT

A manifold for a gas turbine engine includes oppositely facing first and second walls that extend from an annular wall. An undulating wall oppositely faces the annular wall and couples the first wall to the second wall. The walls collectively form a plurality of first chambers in fluid communication with a plurality of second chambers so that each of the second chambers intersperse adjacent first chambers. Each first chamber has a first volume that is greater that a second volume of each second chamber.

15 Claims, 7 Drawing Sheets

(56) References Cited

U.S. PATENT DOCUMENTS

| | | | |
|---|---|---|---|
| 4,883,404 A | 11/1989 | Sherman | |
| 5,011,098 A * | 4/1991 | McLaren | B64D 15/04 244/134 B |
| 5,220,785 A * | 6/1993 | Miller | F02C 7/047 244/134 R |
| 5,944,287 A * | 8/1999 | Rodgers | B64C 21/06 244/134 C |
| 6,427,434 B2 * | 8/2002 | Porte | B64D 15/04 244/134 B |
| 7,017,656 B2 * | 3/2006 | Beddome | F28D 9/0043 165/153 |
| 7,131,612 B2 * | 11/2006 | Baptist | B64D 15/06 244/134 B |
| 2003/0035719 A1 | 2/2003 | Wadia et al. | |
| 2008/0279688 A1 | 11/2008 | Jensen et al. | |
| 2013/0098471 A1 * | 4/2013 | Porte | F02C 7/04 137/15.1 |

\* cited by examiner

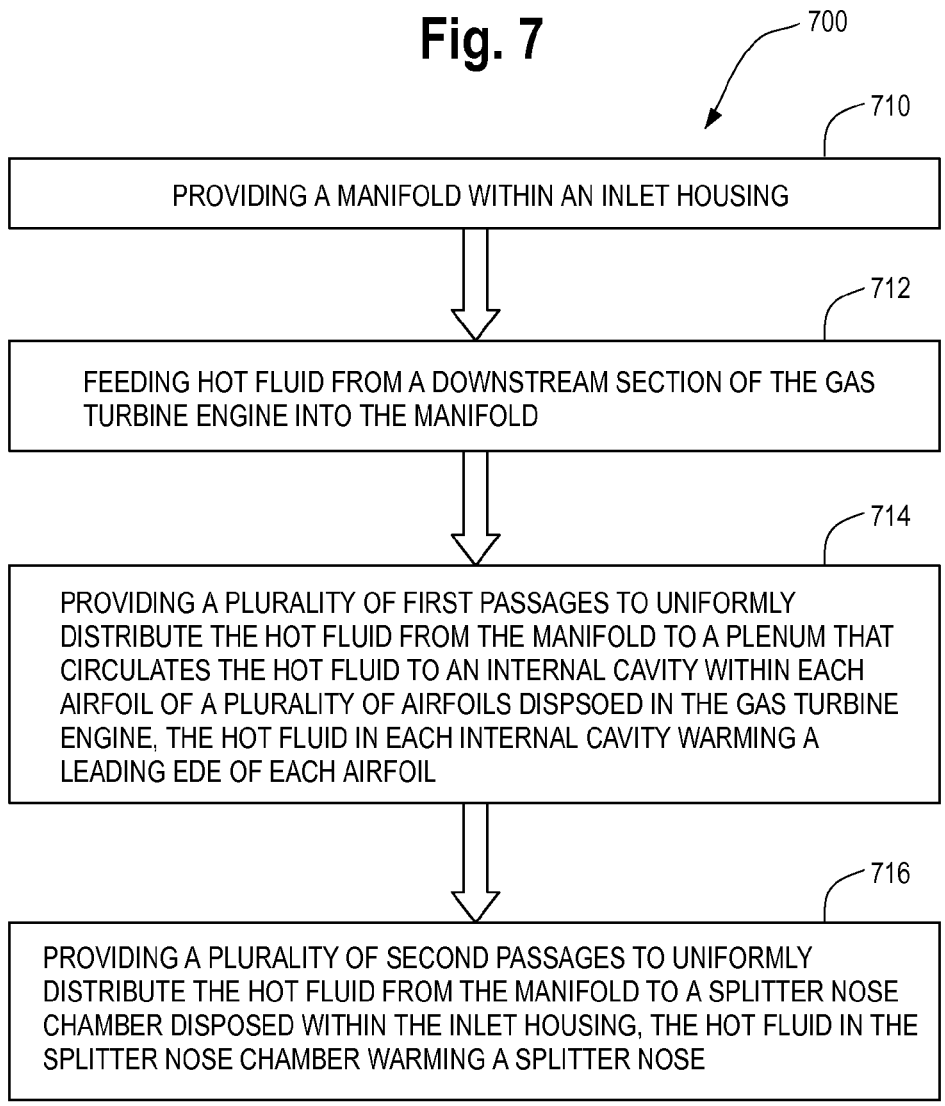

ANTI-ICING INTERNAL MANIFOLD

CROSS-REFERENCE TO RELATED APPLICATION

This application claims priority under 35 USC § 119(e) to U.S. Provisional Patent Application Ser. No. 61/992,681 filed on May 13, 2014.

TECHNICAL FIELD

The subject matter of the present disclosure relates generally to gas turbine engines and, more particularly, relates to air distribution through gas turbine engines.

BACKGROUND

During the operation of a gas turbine engine, ambient air enters the forward section of the engine and is distributed throughout the engine. At certain conditions, such as at low temperature conditions, moisture may form into ice near the forward ambient air intake section of the engine. For example, the leading edges of the inlet guide vanes are particularly susceptible to potential ice accumulation. Another example area susceptible to ice accumulation is the leading edge of the inlet housing splitter nose.

In efforts to prevent ice from accumulating on the leading edges of the inlet guide vanes, conventional engines generally leverage high temperature and high pressure air from the engine high compressor by bleeding this relatively hot air to the inlet guide vane cavities so as to warm the leading edges of the inlet guide vanes. The high compressor bleed air is delivered to the internal cavity of each inlet guide vane via a complex system of external plumbing that includes multiple tubes, fittings and other hardware. The fittings are typically welded to a cover encapsulating a plenum where the high compressor bleed air is collected and distributed through the cavity of each inlet guide vane to warm their leading edges. The geometry and location of other engine components, however, constrain the tubes and fittings to only certain air feed locations on the cover of the plenum. While generally effective, the constrained packaging of the tubes and fittings restrict the air feeds to a few locations on the cover of the plenum that are less than 60 degrees apart from each other, which inhibits a necessary uniform distribution of the high compressor air through the plenum to the cavity of each inlet guide vane. Similarly, uniform distribution of the high compressor bleed air to the inlet housing splitter nose is not feasible in this conventional configuration.

Accordingly, there is a need to provide a uniform distribution of warm air to areas of the engine that are susceptible to ice accumulation, such as the leading edges of the inlet guide vanes and the inlet housing splitter nose, without using heavy external plumbing and hardware components to deliver such air.

SUMMARY

In accordance with an aspect of the disclosure, a manifold for a gas turbine engine is provided. The manifold may include an annular wall. A first wall and a second wall may extend from the annular wall so that the second wall may be oppositely facing the first wall. The first wall may include a plurality of first passages disposed therethrough. The second wall may include a plurality of second passages disposed therethrough. An undulating wall may be oppositely facing the annular wall and may couple the first wall to the second wall. The undulating wall, the first and second walls, and the annular wall collectively form a plurality of first chambers and a plurality of second chambers. Each of the second chambers may intersperse adjacent first chambers. The plurality of first chambers may be in fluid communication with the plurality of second chambers. Each first chamber may have a first volume that is greater than a second volume of each second chamber.

In accordance with another aspect of the disclosure, at least a first fitting may be disposed through the first wall to feed fluid into a first chamber of the plurality of first chambers.

In accordance with yet another aspect of the disclosure, at least a first fitting may be casted integrally with the first wall to feed fluid into a first chamber of the plurality of first chambers.

In accordance with still yet another aspect of the disclosure, each first passage of the plurality of first passages may be circumferentially spaced apart equally from one another.

In further accordance with another aspect of the disclosure, the plurality of second passages may be arranged into sets of three second passages. Each set of three second passages may be disposed in a corresponding first chamber of the plurality of first chambers.

In further accordance with yet another aspect of the disclosure, the plurality of first passages may form first paths to a first section of the gas turbine engine.

In further accordance with still yet another aspect of the disclosure, the plurality of second passages may form second paths to a second section of the gas turbine engine.

In accordance with another aspect of the disclosure, a gas turbine is provided. The gas turbine engine may include an inlet housing. A manifold may be formed within the inlet housing. The manifold may be defined by an annular wall, a first and second wall, and an undulating wall collectively forming a plurality of first chambers and a plurality of second chambers. Each of the second chambers may intersperse adjacent chambers. The plurality of first chambers may be in fluid communication with the plurality of second chambers. Each first chamber may have a first volume that is greater than a second volume of each second chamber.

In accordance with still another aspect of the disclosure, the first wall may include a plurality of first passages disposed therethrough and the second wall may include a plurality of second passages disposed therethrough.

In accordance with still yet another aspect of the disclosure, the plurality of first passages may form first paths from the manifold to a plenum disposed adjacently downstream the first wall.

In further accordance with another aspect of the disclosure, the plurality of second passages may form second paths from the manifold to a chamber disposed within the inlet housing.

In further accordance with yet another aspect of the disclosure, a plurality of inlet guide vanes may be disposed downstream of the inlet housing. Each inlet guide vane of the plurality of inlet guide vanes may include an airfoil and a stem extending radially outwardly from the airfoil. The stem may include a flute. Both the stem and the flute may be contained within the plenum. The flute may form a path from the plenum to an internal cavity within the airfoil.

In accordance with still another aspect of the disclosure, a method of preventing ice from accumulating within a gas turbine engine is provided. The method entails providing a manifold within an inlet housing. Another step may be feeding hot fluid from a downstream section of the gas turbine engine into the manifold. Yet another step may be providing a plurality of first passages to uniformly distribute the hot fluid from the manifold to a plenum that circulates the hot fluid to an internal cavity within each airfoil of a plurality of airfoils disposed in the gas turbine engine. The hot fluid in each internal cavity may warm a leading edge of each airfoil. Still another step may be providing a plurality of second passages to uniformly distribute the hot air from the manifold to a chamber disposed within the inlet housing. The hot fluid in the chamber may warm a splitter nose.

In accordance with an even further aspect of the disclosure, the method may include forming the manifold to include a plurality of first chambers and a plurality of second chambers. Each of the second chambers may intersperse adjacent first chambers. The plurality of first chambers may be in fluid communication with the plurality of second chambers. Each first chamber may have a first volume that is greater than a second volume of each second chamber.

Other aspects and features of the disclosed systems and methods will be appreciated from reading the attached detailed description in conjunction with the included drawing figures. Moreover, selected aspects and features of one example embodiment may be combined with various selected aspects and features of other example embodiments.

BRIEF DESCRIPTION OF THE DRAWINGS

For further understanding of the disclosed concepts and embodiments, reference may be made to the following detailed description, read in connection with the drawings, wherein like elements are numbered alike, and in which:

FIG. 7 is a flowchart illustrating a sample sequence of steps which may be practiced in accordance with the teachings of this disclosure.

It is to be noted that the appended drawings illustrate only typical embodiments and are therefore not to be considered limiting with respect to the scope of the disclosure or claims. Rather, the concepts of the present disclosure may apply within other equally effective embodiments. Moreover, the drawings are not necessarily to scale, emphasis generally being placed upon illustrating the principles of certain embodiments.

DETAILED DESCRIPTION

Throughout this specification the terms "downstream" and "upstream" are used with reference to the general direction of gas flow through the engine and the terms "axial", "radial" and "circumferential" are generally used with respect to the longitudinal central engine axis.

Figure 1:
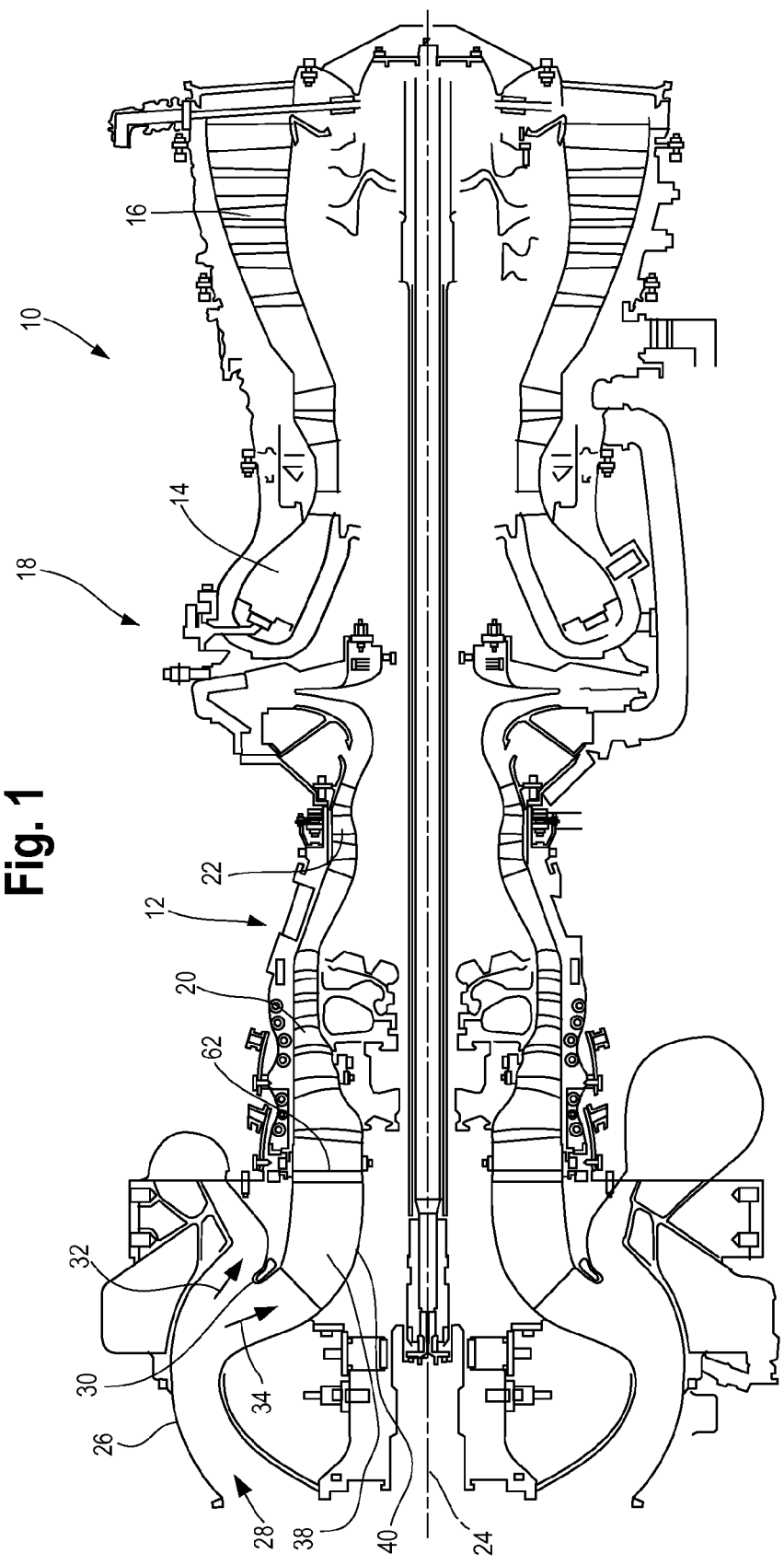
FIG. 1 is a side view of a gas turbine engine with portions sectioned and broken away to show details of the present disclosure.

Referring now to FIG. 1, a gas turbine engine constructed in accordance with the present disclosure is generally referred to by reference numeral 10. The gas turbine engine 10 includes a compressor section 12, a combustor 14 and a turbine 16. The serial combination of the compressor section 12, the combustor 14 and the turbine 16 is commonly referred to as a core engine 18. The compressor section 12 includes a low pressure compressor 20 and a high pressure compressor 22, which is downstream of the low pressure compressor 20. The engine 10 is circumscribed about a longitudinal central axis 24.

An inlet particle separator 26 is located upstream of the low pressure compressor 20. Ambient air 28 enters the inlet particle separator 26 and is bifurcated downstream at the inlet housing splitter nose 30 into bypass air 32 and engine stream air 34. The engine stream air 34 enters the compressor section 12 and is pressurized. The pressurized air then enters the combustor 14. In the combustor 14, the air mixes with jet fuel and is burned, generating hot combustion gases that flow downstream to the turbine 16. The turbine 16 extracts energy from the hot combustion gases to drive the compressor section 12.

Figure 2:
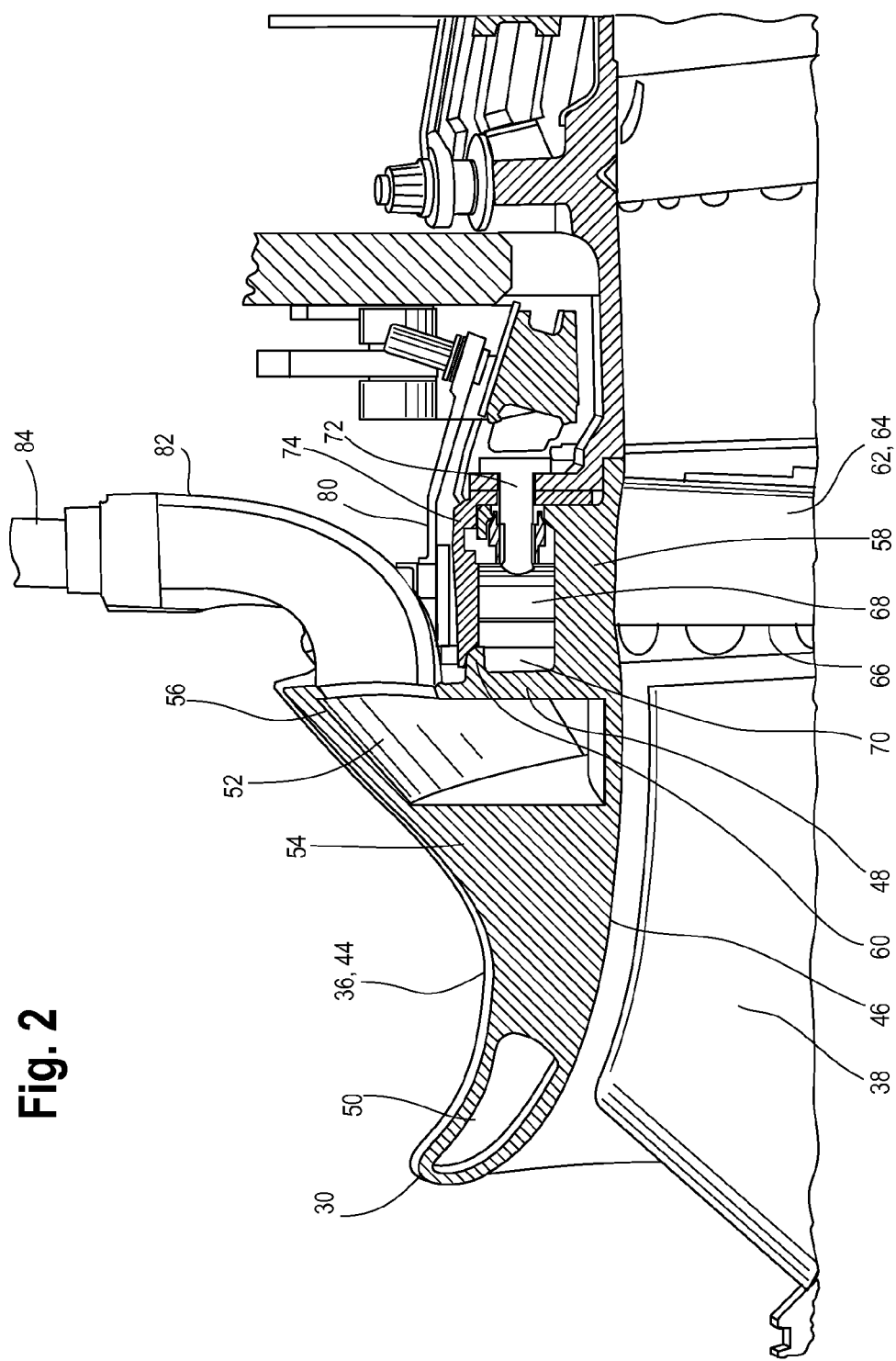
FIG. 2 is an enlarged side view of a manifold disposed within a gas turbine engine with portions sectioned and broken away to show details of the present disclosure.
Figure 3:
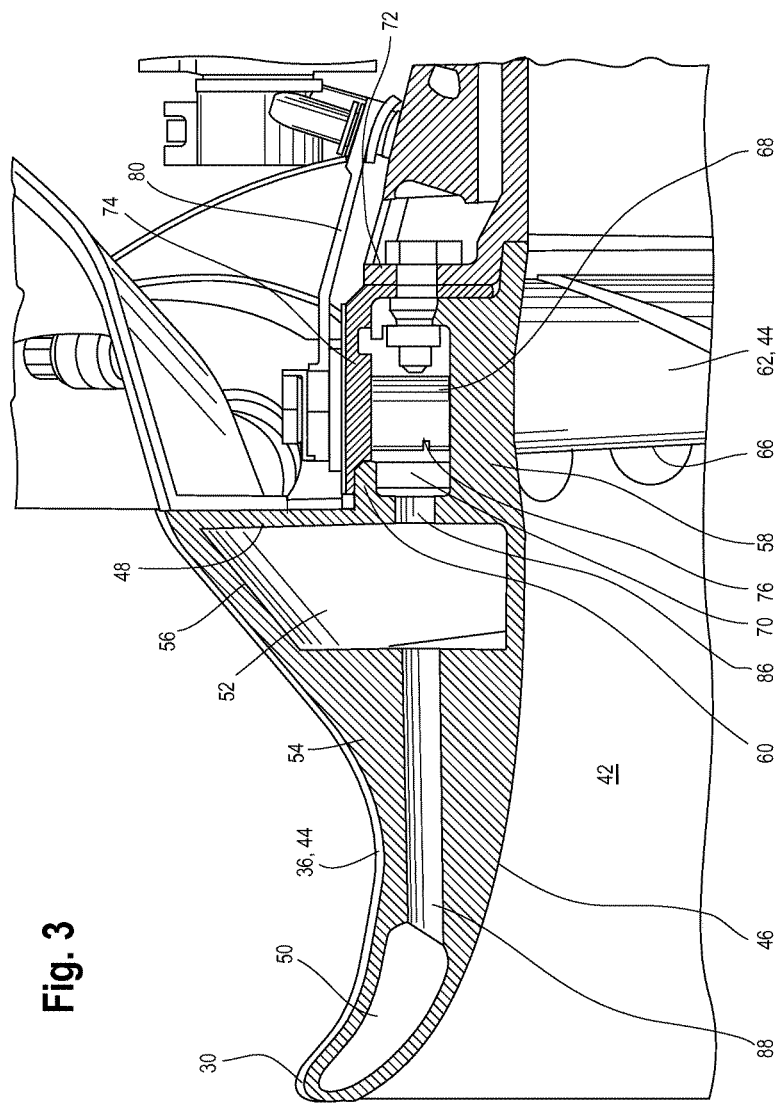
FIG. 3 is another enlarged side view of a manifold disposed within a gas turbine engine with other portions sectioned and broken away to show details of the present disclosure.

With reference to FIGS. 1-3, the inlet housing splitter nose 30 forms the upstream circumferential end of an inlet housing 36, which circumscribes the longitudinal central axis 24. A plurality of struts 38 (one shown in FIG. 2) structurally supports and couples the inlet housing 36 to an inner wall 40 in such a way that an engine stream duct 42 is functionally defined between the inlet housing 36 and the inner wall 40. Each strut of the plurality of struts 38 is circumferentially spaced apart equally from one another so that the majority of engine stream air 34 flows around the struts 42 and downstream through the engine stream duct 42.

The inlet housing 36 may be formed by casting and includes a contoured bypass wall 44 and an annular engine stream wall 46, which meet upstream to form the inlet housing splitter nose 30. A housing wall 48 radially couples the downstream ends of the contoured bypass wall 44 and the engine stream wall 46. The inlet housing 36 also includes an internal splitter nose chamber 50 and an internal manifold 52. The splitter nose chamber 50 is separated from the internal manifold 52 by a substantially annular solid portion 54 of the inlet housing 36. The splitter nose chamber 50 is enclosed by the inlet housing splitter nose 30, the contoured bypass wall 44, the engine stream wall 46 and the solid portion 54. The internal manifold 52 is enclosed by the annular engine stream wall 46, the solid portion 54, the housing wall 48 and an undulating wall 56 (best seen in FIG. 6).

An annular flange 58 extends axially downstream from the housing wall 48 proximate the engine stream duct 42. An annular lip 60 also extends axially downstream from the housing wall 48 and is disposed radially outwardly relative to the flange 58.

A plurality of inlet guide vanes 62 (one shown in FIGS. 2-3) is disposed downstream of the plurality of struts 38 within the engine stream duct 42. Each inlet guide vane of the plurality of inlet guide vanes 62 is circumferentially spaced apart equally from one another. Each inlet guide vane 62 may include an airfoil 64 with a leading edge 66 facing upstream. Each inlet guide vane 62 may also include a stem 68, which extends radially outwardly from the airfoil 64. The airfoil 64 may extend between the inner wall 40 and the flange 58 within the engine stream duct 42. The stem 68, however, extends through a corresponding sealed aperture (not shown) in the flange 58 and extends into an annular inlet guide vane plenum 70. The plenum 70 is enclosed by the flange 58, a section of the housing wall 48, an interconnected wall 72, and an annular plenum cover 74, which is coupled to the annular lip 60 and the interconnected wall 72.

Figure 4:
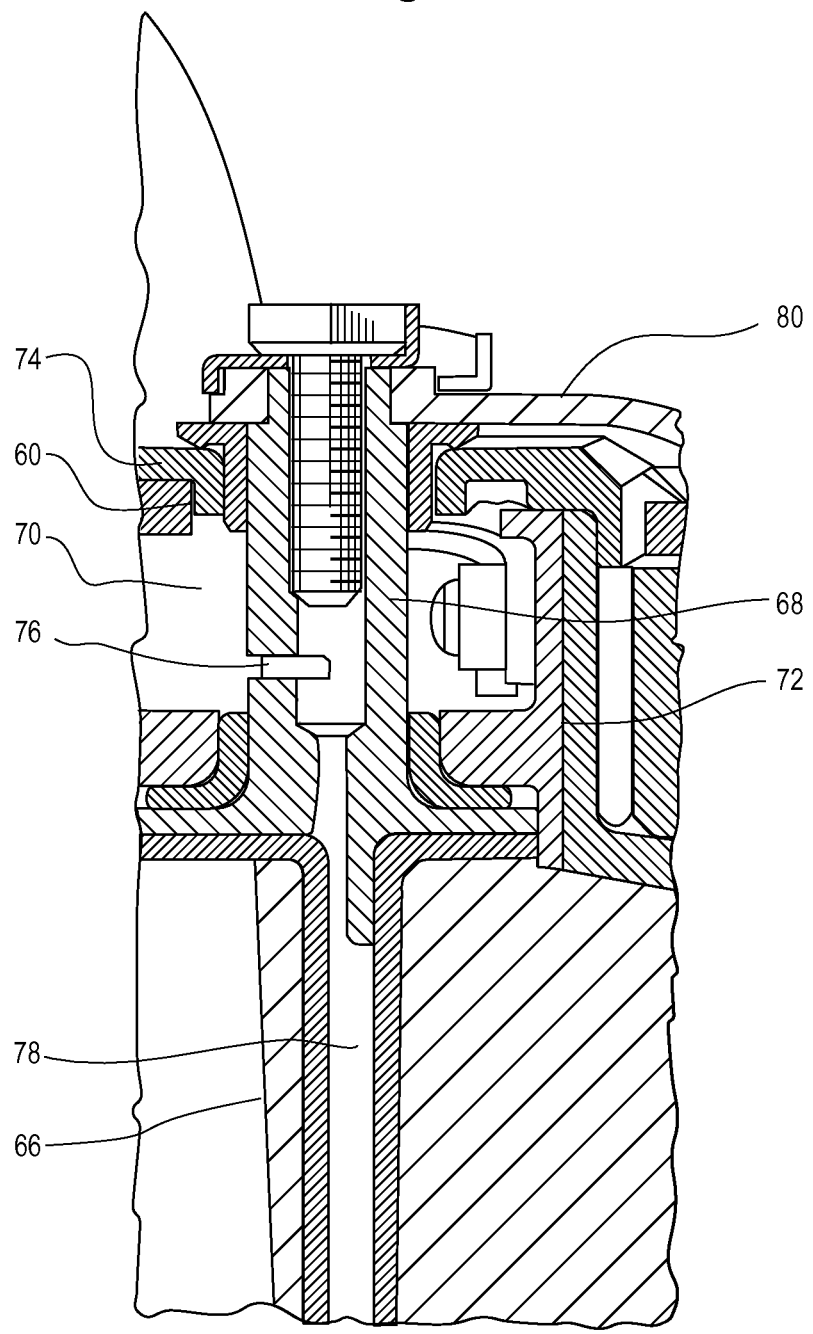
FIG. 4 is an enlarged side view of an inlet guide vane with portions sectioned and broken away to show details of the present disclosure.

As best seen in FIG. 4, the portion of the stem 68 disposed within the plenum 70 includes a flute 76, which follows a path internally through the stem 68 leading into the airfoil cavity 78. The airfoil cavity 78 radially extends internally through the airfoil 64 proximate to the leading edge 66. The stem 68 further extends through a corresponding sealed aperture (not shown) in the plenum cover 74 and this portion of the stem 68 is coupled to a vane arm sweep 80, which may be actuated to position the inlet guide vane 62 to direct the engine stream air 34 in a desired direction downstream.

Figure 5:
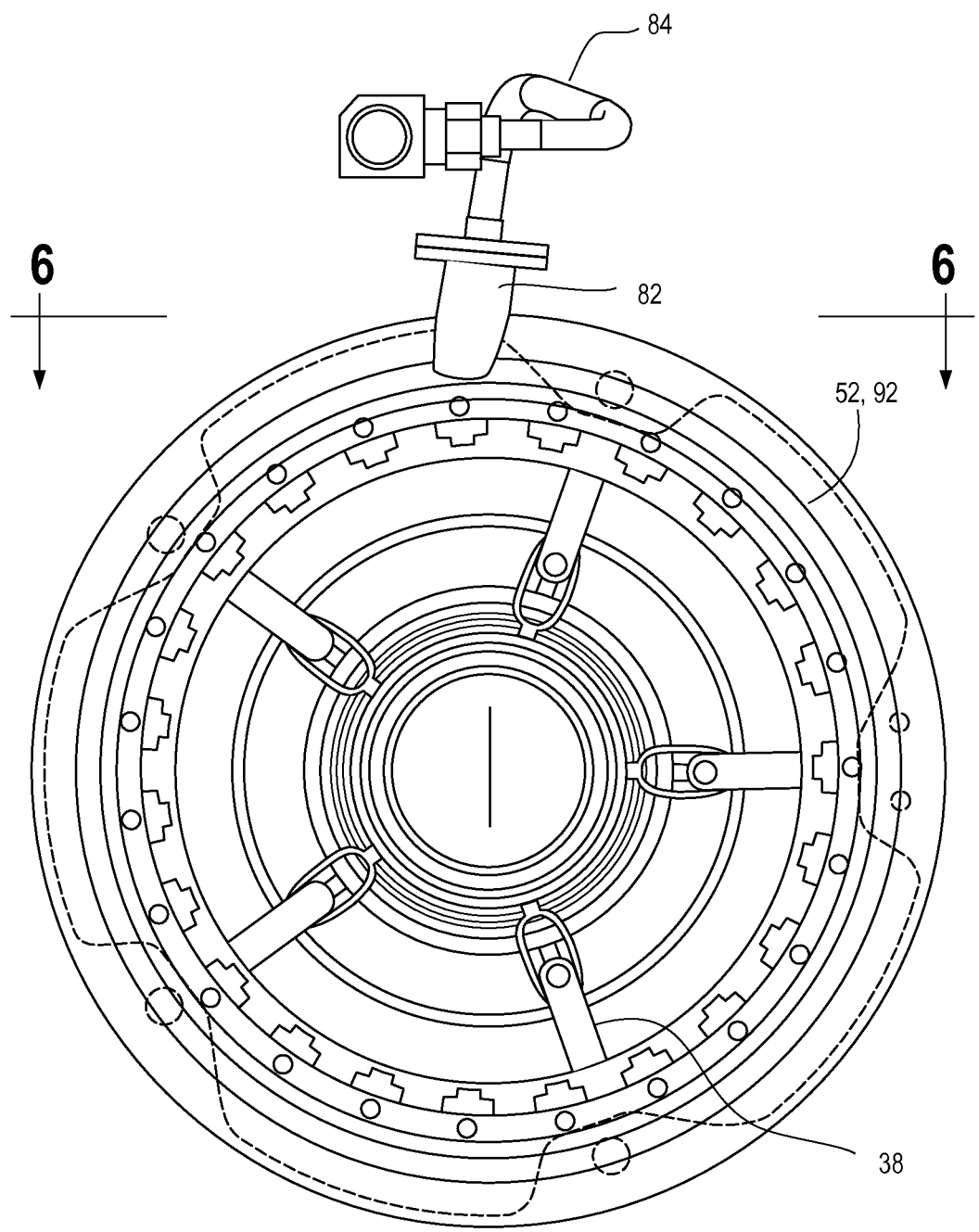
FIG. 5 is an aft view of a manifold depicted in phantom within a housing, constructed in accordance with the teachings of this disclosure.
Figure 6:
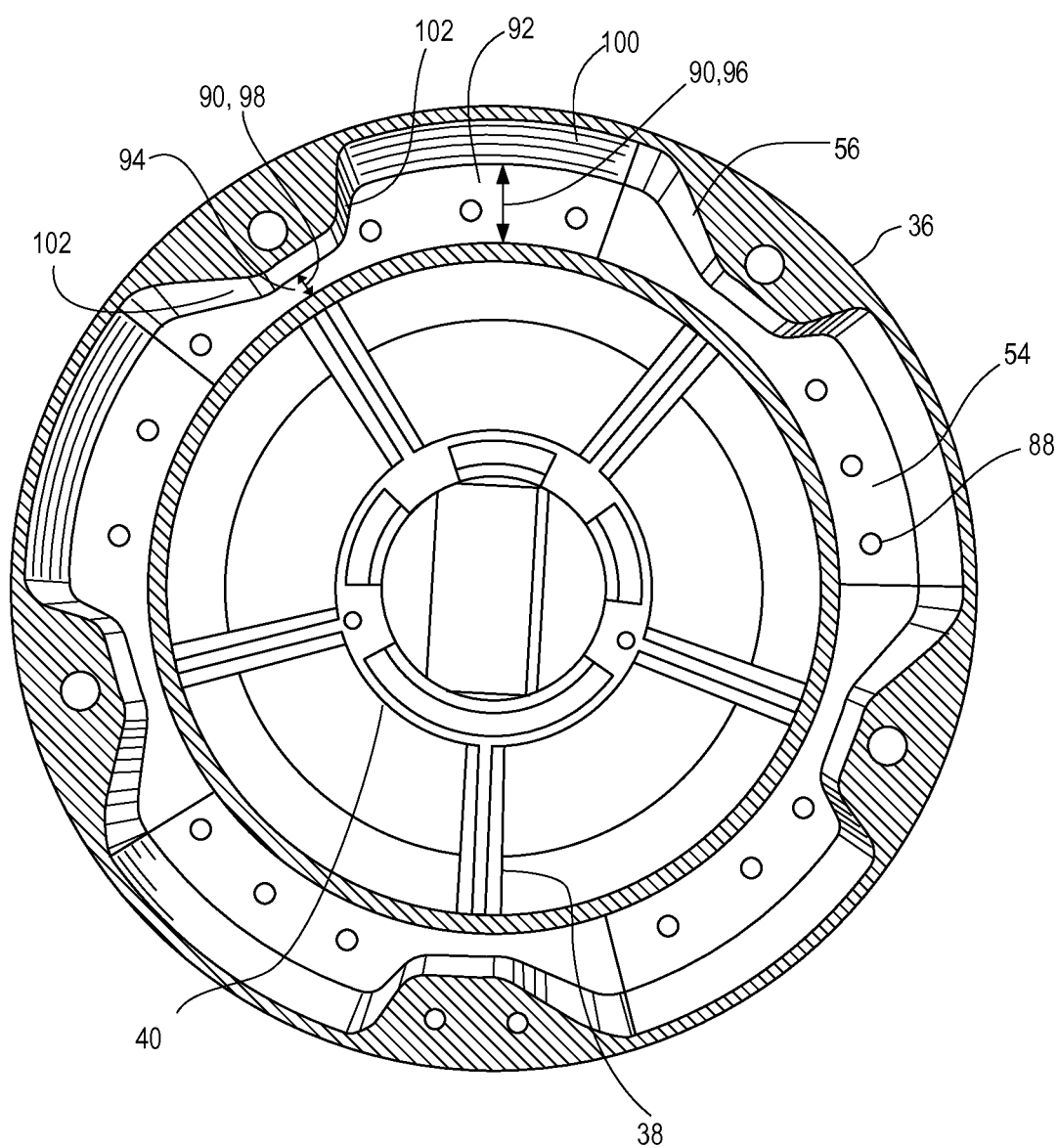
FIG. 6 is a cross-sectional view taken along line 6-6 of FIG. 5, constructed in accordance with the teaching of this disclosure.

The internal manifold 52 is described in more detail below with particular reference to FIGS. 2 and 5-6. The internal manifold 52 collects high temperature and high pressure air delivered from the high pressure compressor 22 via a fitting 82 and a tube 84. The fitting 82 may either be welded directly to the housing wall 48 or may be casted integrally with the housing wall 48 allowing the hot air to enter the internal manifold 52. The fitting 82 is coupled to the tube 84, which transfers the hot air from the high pressure compressor 22. The fitting 82 may be positioned at any suitable location so that the tube 84 may conveniently navigate through the engine 10 from the high pressure compressor 22 to the fitting 82.

A first plurality of passages 86 is disposed through the housing wall 48 creating paths from the internal manifold 52 to the plenum 70. Each passage of the first plurality of passages 86 may be substantially circular in cross-section and is circumferentially spaced apart equally from one another. Each passage 86 may be proximate to a corresponding stem 68 of a corresponding inlet guide vane 62.

A second plurality of passages 88 is disposed through the solid portion 54 creating paths from the internal manifold 52 to the splitter nose chamber 50. Each passage of the second plurality of passages 88 may be substantially circular in cross-section. As a non-limiting example, there may be 15 second passages 88 although there may be more or less.

The undulating wall 56 of the internal manifold 52 has a variable radial distance 90 relative to the engine stream wall 46 such that the undulating wall 56 creates a plurality of first chambers 92 and a plurality of second chambers 94 all within the internal manifold 52. Adjacent first chambers 92 are interspersed with a second chamber 94 so that the chambers 92, 94 are in fluid communication with each other. As a non-limiting example, the internal manifold 52 may include five first chambers 92 and five second chambers 94. The variable radial distance 90 includes a first variable radial distance 96 measured within each of the first chambers 92 and a second variable radial distance 98 measured within each of the second chambers 94. The first variable radial distance 96 measured substantially centrally at each of the first chambers 92 is greater than the second variable radial distance 98 measured substantially centrally at each of the second chambers 94. Thus, each of the first chambers 92 has a volume that is greater than each of the second chambers 94. Each first chamber 92 gradually transitions into adjacent second chambers 94 such that each first variable radial distance 96 is uniform as measured along a central portion 100 of the undulating wall 56 within each first chamber 92 and then the first variable radial distance 96 gradually decreases as measured along the undulating wall transitions 102 towards adjacent second chambers 94.

The second plurality of passages 88 may be arranged through the solid portion 54 such that each first chamber 92 may include a corresponding set of three second passages 88, although other arrangements may also fall within the scope of the appended claims. The fitting 82 may be disposed through the housing wall 48 to correspond with one of the first chambers 92.

The plurality of first chambers 92 may be arranged so that each first chamber 92 is positioned substantially between adjacent struts 38 while each second chamber 94 is proximately aligned with a corresponding strut 38. The smaller geometry of each second chamber 94 relative to each first chamber 92 allows the internal manifold 52 to avoid intersecting with other independent engine 10 features such as, but not limited to structural struts, passages, and tubes.

During engine 10 operation, hot air is bled from the high pressure compressor 22 through the tube 84 and the fitting 82 into a first chamber 92 of the internal manifold 52. In order to settle the incoming air within the internal manifold 52, the geometry of the internal manifold 52 is calculated in correlation with the velocity of the incoming hot air fed from the high compressor 22. Furthermore, the geometry of the gradual volumetric transitions between first chambers 92 and second chambers 94 minimize undesired pressure drops within the internal manifold 52. The air collected and circulated throughout the internal manifold 52 is then delivered uniformly to the internal splitter nose chamber 50 via the first plurality of passages 86 and delivered uniformly to the plenum 70 via the second plurality of passages 88. The hot air collected in the plenum 70 takes the path of least resistance to each flute 76 of each stem 68 and then flows into each airfoil cavity 78. The hot air within each airfoil cavity 78 warms each leading edge 66 to prevent ice accumulation thereon. Similarly, the hot air within the internal splitter nose chamber 50 warms the inlet housing splitter nose 30 to prevent ice accumulation on the splitter nose 30.

FIG. 7 illustrates a flowchart 700 of a sample sequence of steps which may be performed to prevent ice from accumulating within a gas turbine engine. Box 710 shows the step of providing a manifold within an inlet housing. Another step, as illustrated in box 712, is feeding hot fluid from a downstream section of the gas turbine engine into the manifold. Box 714 illustrates the step of providing a plurality of first passages to uniformly distribute the hot fluid from the manifold to a plenum that circulates the hot fluid to an internal cavity within each airfoil of a plurality of airfoils disposed in the gas turbine engine. The hot fluid in each internal cavity warms a leading edge of each airfoil. Yet another step, as shown in box 716, is providing a plurality of second passages to uniformly distribute the hot fluid from the manifold to a splitter nose chamber disposed within the inlet housing. The hot fluid in the splitter nose chamber warms a splitter nose. Another step may be forming the manifold to include a plurality of first chambers and a plurality of second chambers so that each of the second chambers intersperse adjacent first chambers. The plurality of first chambers may be in fluid communication with the plurality of second chambers. Each first chamber may have a first volume that is greater than a second volume of each second chamber. At least a first fitting may be disposed on the manifold to feed the hot fluid into a first chamber of the plurality of first chambers. Alternatively, at least a first fitting may be casted integrally with the manifold to feed the hot fluid into a first chamber of the plurality of first chambers. The plurality of second passages may be formed into sets of three second passages so that each set of three second passages may be disposed in a corresponding first chamber of the plurality of first chambers.

While the present disclosure has shown and described details of exemplary embodiments, it will be understood by one skilled in the art that various changes in detail may be effected therein without departing from the spirit and scope of the disclosure as defined by claims supported by the written description and drawings. Further, where these exemplary embodiments (and other related derivations) are described with reference to a certain number of elements it will be understood that other exemplary embodiments may be practiced utilizing either less than or more than the certain number of elements.

INDUSTRIAL APPLICABILITY

Based on the foregoing, it can be seen that the present disclosure sets forth a manifold for a gas turbine engine that prevents ice from accumulating on the inlet housing splitter nose and the leading edges of each inlet guide vane airfoil. The teachings of this disclosure can be employed to simultaneously provide a uniform distribution of hot fluid to a splitter nose chamber to warm the inlet housing splitter nose and to a plenum that circulates the hot fluid to a cavity within each inlet guide van airfoil to warm the leading edge of each airfoil. Moreover, through the novel teachings set forth above, additional heavy external plumbing and hardware is eliminated from conventional gas turbine engines to reduce overall weight and mitigate spatial constraints within the engine. The reduction of parts will, in turn, reduce costs.

What is claimed is:

1. A manifold for a gas turbine engine, the manifold comprising:
   an annular wall;
   a first wall extending from the annular wall, the first wall including a plurality of first passages being disposed therethrough;
   a second wall extending from the annular wall, the second wall oppositely facing the first wall, the second wall including a plurality of second passages being disposed therethrough; and
   an undulating wall oppositely facing the annular wall and coupling the first wall to the second wall, the undulating wall, the first and second walls, and the annular wall collectively forming a plurality of first chambers and a plurality of second chambers, each of the plurality of second chambers interspersed between adjacent chambers of the plurality of first chambers, the plurality of first chambers being in fluid communication with the plurality of second chambers, and wherein each of the plurality of first chambers having a first volume that is greater than a second volume of each of the plurality of second chambers.

2. The manifold of claim 1, further including at least a first fitting disposed through the first wall to feed fluid into a first chamber of the plurality of first chambers.

3. The manifold of claim 2, wherein the at least first fitting is casted integrally with the first wall to feed fluid into a first chamber of the plurality of first chambers.

4. The manifold of claim 1, wherein each first passage of the plurality of first passages is circumferentially spaced apart equally from one another.

5. The manifold of claim 1, wherein the plurality of second passages is arranged into sets of three second passages, each set of three second passages is disposed in a corresponding first chamber of the plurality of first chambers.

6. The manifold of claim 1, wherein the plurality of first passages forms first paths to a first section of the gas turbine engine.

7. The manifold of claim 1, wherein the plurality of second passages forms second paths to a second section of the gas turbine engine.

8. A gas turbine engine, the engine comprising:
   an inlet housing; and
   a manifold being formed within the inlet housing, the manifold being defined by an annular wall, a first wall, a second wall, and an undulating wall collectively forming a plurality of first chambers and a plurality of second chambers, each of the plurality of second chambers interspersed between adjacent chambers of the plurality of second chambers, the plurality of first chambers being in fluid communication with the plurality of second chambers, and wherein each of the plurality of first chambers having a first volume that is greater than a second volume of each of the plurality of second chambers.

9. The gas turbine engine of claim 8, wherein the first wall includes a plurality of first passages disposed therethrough and the second wall includes a plurality of second passages disposed therethrough.

10. The gas turbine engine of claim 9, wherein the plurality of first passages forms first paths from the manifold to a plenum disposed adjacently downstream the first wall.

11. The gas turbine engine of claim 9, wherein the plurality of second passages forms second paths from the manifold to a chamber disposed within the inlet housing.

12. The gas turbine engine of claim 10, further including a plurality of inlet guide vanes disposed downstream of the inlet housing, each inlet guide vane of the plurality of inlet guide vanes includes an airfoil and a stem extending radially outwardly from the airfoil, the stem includes a flute, the stem and the flute both contained within the plenum, the flute forming a path from the plenum to an internal cavity within the airfoil.

13. The gas turbine engine of claim 12, wherein each first passage of the plurality of first passages is circumferentially spaced apart equally from one another.

14. The gas turbine engine of claim 8, further including at least a first fitting disposed through the first wall to feed fluid into a first chamber of the plurality of first chambers.

15. The gas turbine engine of claim 8, further including at least a first fitting casted integrally with the first wall to feed fluid into a first chamber of the plurality of first chambers.

* * * * *